(12) United States Patent
Huhtasalo et al.

(10) Patent No.: US 11,928,536 B2
(45) Date of Patent: Mar. 12, 2024

(54) RFID LABEL

(71) Applicant: DIGITAL TAGS FINLAND OY, Tampere (FI)

(72) Inventors: Lauri Huhtasalo, Tampere (FI); Juha Ikonen, Nokia (FI)

(73) Assignee: DIGITAL TAGS FINLAND OY, Tampere (FI)

( * ) Notice: Subject to any disclaimer, the term of this patent is extended or adjusted under 35 U.S.C. 154(b) by 0 days.

(21) Appl. No.: 17/755,766

(22) PCT Filed: Nov. 4, 2020

(86) PCT No.: PCT/IB2020/060346
§ 371 (c)(1),
(2) Date: May 6, 2022

(87) PCT Pub. No.: WO2021/090189
PCT Pub. Date: May 14, 2021

(65) Prior Publication Data
US 2022/0414412 A1 Dec. 29, 2022

(30) Foreign Application Priority Data
Nov. 8, 2019 (SE) .................................. 1951287-0

(51) Int. Cl.
*G06K 19/077* (2006.01)
*G06K 19/07* (2006.01)
*H01Q 1/22* (2006.01)

(52) U.S. Cl.
CPC ... *G06K 19/07718* (2013.01); *G06K 19/0723* (2013.01); *G06K 19/0776* (2013.01); *H01Q 1/2208* (2013.01)

(58) Field of Classification Search
CPC ......... G06K 19/07718; G06K 19/0723; G06K 19/0776; G06K 19/00; G06K 19/067; G06K 19/07; H01Q 1/2208
(Continued)

(56) References Cited

U.S. PATENT DOCUMENTS 8,169,318 B2 * 5/2012 Atherton ............ G08B 13/2437
343/718
2003/0179150 A1 9/2003 Adair et al.
(Continued)

FOREIGN PATENT DOCUMENTS

CN 103824109 A 5/2014
EP 3 435 359 A1 1/2019
(Continued)

OTHER PUBLICATIONS

International Search Report and Written Opinion for PCT/IB2020/060346 dated Jan. 7, 2021 (9 pages).
(Continued)

*Primary Examiner* — Edwyn Labaze
(74) *Attorney, Agent, or Firm* — Alston & Bird LLP

(57) ABSTRACT

The present invention relates to an RFID label comprising an RFID tag which tag comprises an RFID antenna and an IC, which IC is attached onto the antenna such that the antenna and the IC forms the RFID tag. The inventive label further comprising an elongated substrate with a first surface and a second surface, wherein the first surface is siliconized, and the second surface is carrying the RFID tag, and a sticky adhesive layer which is arranged onto the second surface of the substrate and over the RFID tag.

20 Claims, 1 Drawing Sheet

(58) Field of Classification Search
USPC .................................. 235/492, 380, 487, 375
See application file for complete search history.

(56) References Cited

U.S. PATENT DOCUMENTS

| | | | |
|---|---|---|---|
| 2004/0262722 A1* | 12/2004 | Sekiguchi | H01L 23/49855 |
| | | | 438/464 |
| 2005/0128086 A1 | 6/2005 | Brown et al. | |
| 2010/0032487 A1 | 2/2010 | Bohn et al. | |
| 2012/0012658 A1 | 1/2012 | Kiichi | |
| 2012/0056002 A1 | 3/2012 | Ritamaki et al. | |
| 2013/0206846 A1* | 8/2013 | Wilkinson | G06K 19/07749 |
| | | | 235/492 |
| 2014/0079894 A1* | 3/2014 | Buchbinder | B32B 33/00 |
| | | | 156/227 |
| 2018/0168048 A1 | 6/2018 | Maijala | |
| 2020/0406573 A1* | 12/2020 | Huhtasalo | B31D 1/021 |

FOREIGN PATENT DOCUMENTS

| | | | | |
|---|---|---|---|---|
| JP | 2009-169899 A | | 5/2014 | |
| KR | 20170099977 | * | 1/2017 | ....... G06K 19/07749 |
| WO | WO 2012/110702 A2 | | 8/2012 | |
| WO | WO 2016/189446 A1 | | 12/2016 | |
| WO | WO 2019/073380 A1 | | 4/2019 | |

OTHER PUBLICATIONS

Extended European Search Report of EP Patent Application No. 20884198.1, dated Oct. 27, 2023, 6 page(s).

* cited by examiner

RFID LABEL

CROSS-REFERENCE TO RELATED APPLICATIONS

The present application is a national phase entry of International Patent Application No. PCT/IB2020/060346, filed Nov. 4, 2020, which claims priority to Swedish Patent Application No. 1951287-0, filed Nov. 8, 2019, which are each incorporated herein by reference in their entirety.

TECHNICAL FIELD

The present invention relates to an RFID label comprising an RFID tag which tag comprises an RFID antenna and an IC, which IC is attached onto the antenna such that the antenna and the IC forms the RFID tag.

In the following the expression RFID (Radio Frequency Identification) tag will be frequently used. An RFID tag is a tag that is intended to be attached onto objects to be identified in a radio-frequency identification system.

An RFID tag comprising an RFID antenna and an RFID IC (integrated circuit or microchip), which IC is electrically connected onto the antenna.

An RFID label is in this context a label which carrying an RFID tag. The label is intended to be attached onto different kind of objects via an adhesive layer of the label.

PRIOR ART-PROBLEM

Figure 1A:
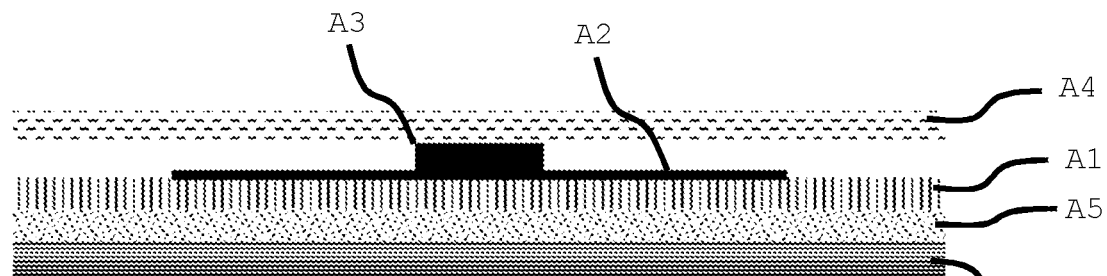

FIG. 1A discloses a conventional three-layer structure of an RFID label. The RFID label structure comprising a substrate (A1) with an antenna (A2) and an IC (A3). The structure further comprising a face paper layer (A4) with adhesive that covers the antenna and the IC, an adhesive (A5) and a siliconized release layer (A6), which is removed when attaching the RFID label onto an object.

Figure 1B:
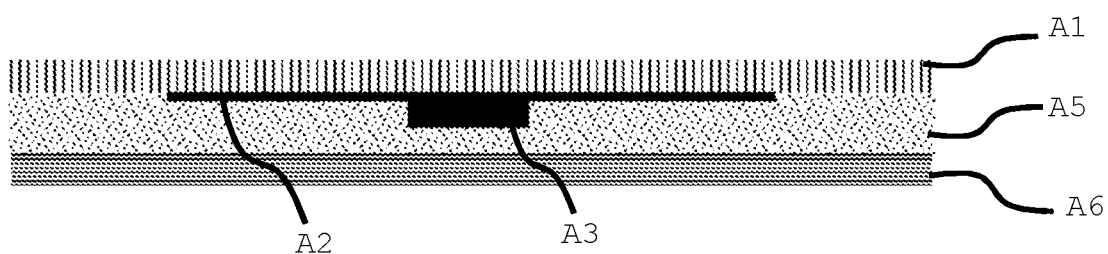

FIG. 1B discloses a conventional two-layer structure of an RFID label. The structure comprising a substrate (A1) with an antenna (A2) and an IC (A3). The structure further comprising an adhesive (A5) a siliconized release layer (A6), which release layer is removed when attaching the RFID label onto an object.

Above prior art drawbacks in that they all are needed several layers and/or a release layer in order to attach the label, which in turns are costly and not environmentally friendly.

OBJECT OF INVENTION

An object with the invention is to provide a more environmentally friendly RFID label, which is more cost efficient in comparison to prior art and in turn solves the above-mentioned problems.

SUMMARY OF THE INVENTION

In accordance of the invention, the RFID label is characterized in that RFID label further comprising:

an elongated substrate with a first surface and a second surface, wherein the first surface is siliconized, and the second surface is carrying the RFID tag, and a sticky adhesive layer which is arranged onto the second surface of the substrate and over the RFID tag.

FIGURES AND DETAILED DESCRIPTION OF THE INVENTION

FIGS. 1A and 1B disclose prior art of conventional RFID labels having two and three label structures, see above "Prior art-Problem".

Figure 2:
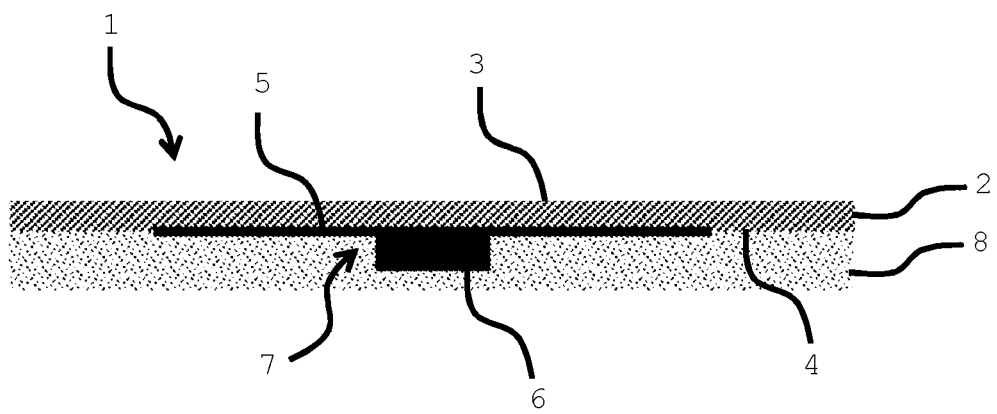

FIG. 2 discloses a schematic view of an RFID label in accordance with the invention.

In the following, the invention will be described more in detail with reference to FIG. 2. The invention discloses an RFID label 1 which comprising a substrate 2 with a first surface 3 and an opposite second surface 4 which faces away from the first surface 3. The substrate is preferably made of a paper or a paper board material. However, the skilled person realizes that other non-conductive substrate materials are possible.

The first surface 3 is siliconized, i.e. the surface has been coated or treated with silicon, such that the surface has non-sticky properties. The second surface 4 is untreated, i.e. it has not been siliconized.

The RFID label further comprising an RFID tag 7 which tag comprises an RFID antenna 5 and an integrated chip (IC) 6. The IC is electrically connected to the antenna such that the antenna and the IC forms the RFID tag. The RFID tag is attached to the substrate on the untreated, second surface 4.

The skilled person realizes that many ways are possible to form the RFID tag onto the second surface. In a first embodiment, of forming the antenna, electrically conductive solid particles are formed, in a predefined pattern, onto the second surface of the web.

The conductive material is then cured to form a solidified, more compact antenna pattern. This can e.g. be made by application of heat with a suitable heater. Hereby, the conductive material is preferably heated to a temperature exceeding a characteristic melting temperature of the conductive material.

The transfer of the conductive particles and the curing and solidification may be made in the way disclosed in one or several of the WO2013/113995, WO2009/135985, WO2008/006941 and WO2016/189446. All said documents hereby being incorporated in their entirety by reference.

Further, other ways of forming the conductive material in a pattern can also be used. In a second embodiment the forming of the RFID antenna can be made by additive printing with a conductive ink. A conductive ink is an ink comprising conductive particles. The conductive ink can for example be silver ink, copper ink or graphene ink. The conductive inks are then made conductive by drying them or treating them with hot-air, radiation (UV, EB), photonic curing, laser or some other treatment method.

In a third embodiment the forming of the RFID antenna is made by first providing the second surface with a conductive layer, preferably an aluminum foil. Parts of the conductive layer is then subtracted, such that the remaining conductive layer, on the collar material web, forms the RFID antenna. The subtraction of the conductive layer into the desired conductive pattern could for example be through cutting, grinding, brushing or the like.

Thereafter, the method comprising the step of attaching the RFID IC onto the antenna, such that, an electrical connection between the IC and the antenna is established, wherein the RFID tag 3 is formed.

RFID label further comprising a sticky adhesive layer 8 which is applied onto the second surface 4 of the substrate and over the RFID tag 7. Hence, the adhesive layer covers the antenna 5, the IC 6 and the second surface 4.

The elongated substrate 2 carrying several RFID tags 7 which tags are arranged on the second surface of the substrate. The RFID tags are arranged at a predetermined distance between two adjacent RFID tags.

In a preferred embodiment the substrate is perforated between two adjacent tags, such that the tags can be separated manually or automatically in an RFID tag application process. However, the skilled person realizes that other separation methods are possible such as cutting via scissor or knife or similar equipment, where a perforation is not necessary.

The RFID label is rolled up to form a roll wherein the siliconized first surface 3 faces against and covers the sticky adhesive layer 8. Since the siliconized surface 4 covers the adhesive layer 8, in the roll, no additional silicone liner or similar is needed to protect the adhesive layer 8.

Finished sticky RFID label can be implemented by cutting the label during application and then fasten the RFID label directly on a desired object.

There are several benefits with the present invention in comparison to conventional RFID labels. The inventive label only consists of one single substrate layer, i.e. no release layer or additional layer are necessary. The main benefit of this invention is minimized amount of raw material that enables cost optimization and environmentally friendly very thin product structure. This means that each roll will have about two times more labels, which in turns means that shipment costs, and related pollution, will be greatly reduced. The production processes become more efficient as rolls need to be exchanged less often. The carbon footprint of the product is obviously reduced in comparison to conventional RFID labels.

In the foregoing, the invention has been described based on some specific embodiments. However, a person skilled in the art realises that other embodiments and variants are possible within the scope of the following claims.

The invention claimed is:

1. RFID label comprising an RFID tag which tag comprises an RFID antenna and an IC, which IC is attached onto the antenna such that the antenna and the IC forms the RFID tag, wherein the label further comprises:
    an elongated substrate with a first surface and a second surface, wherein the first surface is siliconized, and the second surface is carrying the RFID tag, and
    a sticky adhesive layer which is arranged onto the second surface of the substrate and over the RFID tag.

2. RFID label according to claim 1, wherein the RFID label is rolled up to form a roll, such that the siliconized first surface of the substrate facing against and covering the adhesive layer.

3. RFID label according to claim 2, wherein the substrate is made of a paper or paper board.

4. RFID label according to claim 3, wherein the elongated substrate carrying several RFID tags which are arranged on the substrate at a predetermined distance between two adjacent RFID tags.

5. RFID label according to claim 4, wherein the substrate is perforated between two adjacent tags, such that they can be separated manually or automatically in tag application process.

6. RFID label according to claim 2, wherein the elongated substrate carrying several RFID tags which are arranged on the substrate at a predetermined distance between two adjacent RFID tags.

7. RFID label according to claim 6, wherein the substrate is perforated between two adjacent tags, such that they can be separated manually or automatically in tag application process.

8. RFID label according to claim 2, wherein the RFID antenna has been formed directly onto the second surface of the substrate and the IC has been attached onto the antenna, such that, an electrical connection between the IC and the antenna has been established.

9. RFID label according to claim 1, wherein the substrate is made of a paper or paper board.

10. RFID label according to claim 9, wherein the elongated substrate carrying several RFID tags which are arranged on the substrate at a predetermined distance between two adjacent RFID tags.

11. RFID label according to claim 10, wherein the substrate is perforated between two adjacent tags, such that they can be separated manually or automatically in tag application process.

12. RFID label according to claim 9, wherein the RFID antenna has been formed directly onto the second surface of the substrate and the IC has been attached onto the antenna, such that, an electrical connection between the IC and the antenna has been established.

13. RFID label according to claim 1, wherein the elongated substrate carrying several RFID tags which are arranged on the substrate at a predetermined distance between two adjacent RFID tags.

14. RFID label according to claim 13, wherein the substrate is perforated between two adjacent tags, such that they can be separated manually or automatically in tag application process.

15. RFID label according to claim 14, wherein the RFID antenna has been formed directly onto the second surface of the substrate and the IC has been attached onto the antenna, such that, an electrical connection between the IC and the antenna has been established.

16. RFID label according to claim 13, wherein the RFID antenna has been formed directly onto the second surface of the substrate and the IC has been attached onto the antenna, such that, an electrical connection between the IC and the antenna has been established.

17. RFID label according to that claim 1, wherein the RFID antenna has been formed directly onto the second surface of the substrate and the IC has been attached onto the antenna, such that, an electrical connection between the IC and the antenna has been established.

18. RFID label according to claim 17, wherein the RFID antenna is formed by an antenna pattern of electrically conductive solid particles and that the conductive material has been heated to a temperature exceeding a characteristic melting point of the material, such that the RFID antenna is formed.

19. RFID label according to claim 17, wherein the RFID antenna has been produced by additive printing, wherein the antenna has been printed with a conductive ink.

20. RFID label according to claim 17, wherein the substrate is laminated with a conductive layer and wherein the RFID is formed by using subtractive manufacturing, wherein parts of the conductive layer are subtracted, such that the remaining conductive layer on the substrate web forms the RFID antenna.

* * * * *

UNITED STATES PATENT AND TRADEMARK OFFICE
CERTIFICATE OF CORRECTION

| | | |
|---|---|---|
| PATENT NO. | : 11,928,536 B2 | Page 1 of 1 |
| APPLICATION NO. | : 17/755766 | |
| DATED | : March 12, 2024 | |
| INVENTOR(S) | : Lauri Huhtasalo et al. | |

It is certified that error appears in the above-identified patent and that said Letters Patent is hereby corrected as shown below:

In the Claims

In Column 4, Line 45, Claim 17, delete "to that" and insert -- to --, therefor.

Signed and Sealed this
Eleventh Day of June, 2024

Katherine Kelly Vidal
*Director of the United States Patent and Trademark Office*